United States Patent
Yuasa et al.

(10) Patent No.: US 10,895,639 B2
(45) Date of Patent: Jan. 19, 2021

(54) SENSOR PLATFORM IMPROVEMENT UTILIZING SOUND SENSOR ANALYSIS

(71) Applicant: Avanti R&D, Inc., Torrance, CA (US)

(72) Inventors: Go Yuasa, Rancho Palos Verdes, CA (US); Mike Ramirez, Redondo Beach, CA (US); Dustin Gyurina, Carson, CA (US)

(73) Assignee: Avanti R&D, Inc., Torrance, CA (US)

(*) Notice: Subject to any disclaimer, the term of this patent is extended or adjusted under 35 U.S.C. 154(b) by 165 days.

(21) Appl. No.: 16/203,760

(22) Filed: Nov. 29, 2018

(65) Prior Publication Data
US 2019/0162848 A1 May 30, 2019

Related U.S. Application Data

(60) Provisional application No. 62/592,637, filed on Nov. 30, 2017.

(51) Int. Cl.
| | |
|---|---|
| *G01S 15/89* | (2006.01) |
| *A63B 24/00* | (2006.01) |
| *B60W 40/06* | (2012.01) |
| *G01N 29/04* | (2006.01) |

(52) U.S. Cl.
CPC .......... *G01S 15/89* (2013.01); *A63B 24/0062* (2013.01); *B60W 40/06* (2013.01); *G01N 29/04* (2013.01); *A63B 2220/78* (2013.01); *A63B 2220/833* (2013.01)

(58) Field of Classification Search
CPC ........ G01S 15/89; G01S 13/89; G01S 13/865; G01S 13/885; B60W 40/06; G01N 29/04; G01N 29/46; G01N 29/14
See application file for complete search history.

(56) References Cited

U.S. PATENT DOCUMENTS

| 8,538,667 B2* | 9/2013 | Friedlander ........... B60W 40/06 701/117 |
| 9,377,528 B2* | 6/2016 | Birken ............... G01B 11/2513 |
| 2009/0140887 A1* | 6/2009 | Breed .................. G08G 1/0112 340/990 |
| 2009/0282156 A1* | 11/2009 | Jung ...................... G01D 9/005 709/228 |

(Continued)

FOREIGN PATENT DOCUMENTS

WO 2011/116375 A1 9/2011

*Primary Examiner* — Helen C Kwok
(74) *Attorney, Agent, or Firm* — Baba Patent Agency

(57) ABSTRACT

A sensor platform being installed on a vehicle traveling on a road or a sports training device, the sensor platform including, a sensor unit configured by an acceleration sensor for capturing environmental data transmitted from an object to be surveyed, a data selector/variable filter for selecting necessary data or limiting data frequency of the environmental data transmitted from the sensor unit, a sound sensor for capturing sound signals from the object to be surveyed, and a processing unit for running computer programs including algorithms for controlling the sensor unit and the data selector/variable filter, processing output data from the data selector/variable filter and the sound sensor, and setting a threshold level, wherein the processing unit processes the output data from data selector/variable filter when the sound signal level is more than the threshold level.

11 Claims, 3 Drawing Sheets

(56) References Cited

U.S. PATENT DOCUMENTS

| | | | |
|---|---|---|---|
| 2013/0018578 A1* | 1/2013 | Matsuo | G08G 1/168 701/431 |
| 2013/0030613 A1* | 1/2013 | Friedlander | E01C 23/01 701/16 |
| 2013/0030724 A1* | 1/2013 | Friedlander | G01N 29/4436 702/56 |

* cited by examiner

SENSOR PLATFORM IMPROVEMENT UTILIZING SOUND SENSOR ANALYSIS

This application claims priority from US Provisional Patent Application No. 62/592,637 filed on Nov. 30, 2017, which is incorporated hereinto by reference.

The present disclosure relates to a sensor platform being installed on a vehicle traveling on a road or a sports training device.

BACKGROUND OF THE INVENTION

Analysis of environmental data obtained by sensor platforms used in road surface environmental surveys and sports training requires large and expensive equipment. Current sensor platforms used in road surface environmental survey and sports training have been widely used. The platforms are designed to obtain physical data associated with road surface condition or sports training via sensors, such as three-dimensional accelerometers, gyroscopes, as well as video cameras in order to generate numerical data associated with road surface conditions or motion of physical parts of the body of athletes and associated sports equipment.

Further, those sensor platforms are sometimes bulky, heavy and expensive. Those sensor platforms need to include high performance computer systems to analyze big data obtained by the sensors therein such as ultra-sound sensors, high-speed camera to obtain road surface data when moving at high-speed. Even using high performance computer systems, those data may not result in enough accuracy in road surface environmental survey and the sports category due to unnecessary data and noise signals to block the desired data.

In road surface environmental surveys in a prior art, it is necessary to prepare a large dedicated vehicle including expensive sensor platforms, which require highly precise sensor equipment particularly when driving the vehicle in a high speed on the road to be observed. These sensor platforms used in the road surface environmental survey include CPU which runs computer programs for controlling and analyzing data from sensors such as ultrasonic sensors and high-speed video cameras for detecting road surface condition, which are expensive platforms. High-speed video cameras are required to capture road surface conditions in high-speed driving. Accordingly, the numbers of these vehicles housing these expensive sensor platforms are limited in governmental agencies. Thus, the areas that can be subject to a road survey are limited.

OBJECTIVES

An objective of an embodiment of the present invention is to provide sensor platforms to efficiently process data which can be acquired by associated sensors in highly efficient manner with less expensive systems.

SUMMRAY OF THE INVENTION

The aforementioned objective of the present invention is accomplished by a first embodiment of a sensor platform being installed on a vehicle traveling on a road or a sports training device, the sensor platform including:

a sensor unit configured with an acceleration sensor for capturing environmental data transmitted from an object to be surveyed;

a data selector/variable filter for selecting necessary data or limiting data frequency transmitted from the sensor unit;

a sound sensor for capturing sound signals from the object to be surveyed; and a processing unit for running computer programs including algorithms for controlling the sensor unit and the data selector/variable filter, processing output data from the data selector/variable filter and the sound sensor, and setting a threshold level, wherein the processing unit processes the output data from data selector/variable filter when the sound signal level is more than the threshold level.

A sound sensor is incorporated into the sensor platform to adjust/cancel/filter and improve accuracy/quality of using other sensors. Further, the output signals from the sound sensor is used to identify cracks on the road surface or other road surface distress imperfections by comparing with refence sound pattern.

The aforementioned objective of the present invention is accomplished by a second embodiment of the sensor platform of in the first embodiment, wherein the algorithms further include functions for starting an enforced learning mode for collecting specific signal patterns found in the output data from the data selector/variable filter and the sound sensor to be used when the algorithms analyze the output data from the data selector/variable filter and sound sensor to form the specific signal patterns as reference patterns.

By incorporating sound sensor into current sensor platform, it becomes possible not only to improve detecting capabilities by utilizing the reference patterns, but also it becomes possible for the processing unit to efficiently process the output data from other sensors.

The aforementioned objective of the present invention is accomplished by a third embodiment of the sensor platform in the second embodiment wherein the enforced learning mode starts when one of output signal level from the sensor unit is more than a predetermined threshold level.

It becomes possible to automatically start enforced learning mode which is safety and convenient for drivers of the vehicle.

The aforementioned objective of the present invention is accomplished by a fourth embodiment of the sensor platform in the sensor platform of the third embodiment, wherein the algorithms are arranged to automatically stop processing data from the data selector/variable filter, and enter a calibration mode when identifying a first predetermined bump pattern found on a surface of the road for showing beginning of a calibration area.

The aforementioned objective of the present invention is accomplished by a fifth embodiment of the sensor platform in the fourth embodiment, wherein structure of the first predetermined pattern formed on the surface of the road is shaped so that frequencies of sound signals of the first predetermined pattern obtained from output of the sound sensor falls in the an audible frequency band when driving the vehicle at a speed between 5 miles/hour and 65 miles/hour.

The aforementioned objective of the present invention is accomplished by a sixth embodiment of the sensor platform in the fourth embodiment, wherein structure of the first predetermined pattern formed on the surface of the road is shaped so that frequencies of sound signals of the first predetermined pattern obtained from output of the sound sensor falls outside of an audible frequency band when driving the vehicle at a speed between 5 miles/hour and 65 miles/hour.

It becomes possible to not only improve detection capability by incorporating a sound sensor but also to efficiently process data from other sensors. In other words, since sound data can be used to detect environmental condition changes, which cannot be detected by data from vibration sensors due to signal to noise ratio (signals in the noise sometimes cannot be detected), sound data can be used to as road environmental information instead of information from vibration or acceleration sensors.

Since sound sensors are less expensive parts compared with a high-speed video camera and a gyro, it becomes possible to increase the number of sensor platforms including sound sensor. In addition, since sound sensors are relatively low-priced parts, the number of systems including these sensor platforms having sound sensors instead of high-speed cameras can be increased.

DETAILED DESCRIPTION OF THE PREFERRED EMBODIMENT

Followings are embodiments related to the present invention.

EXPAMPLE 1

Figure 1:
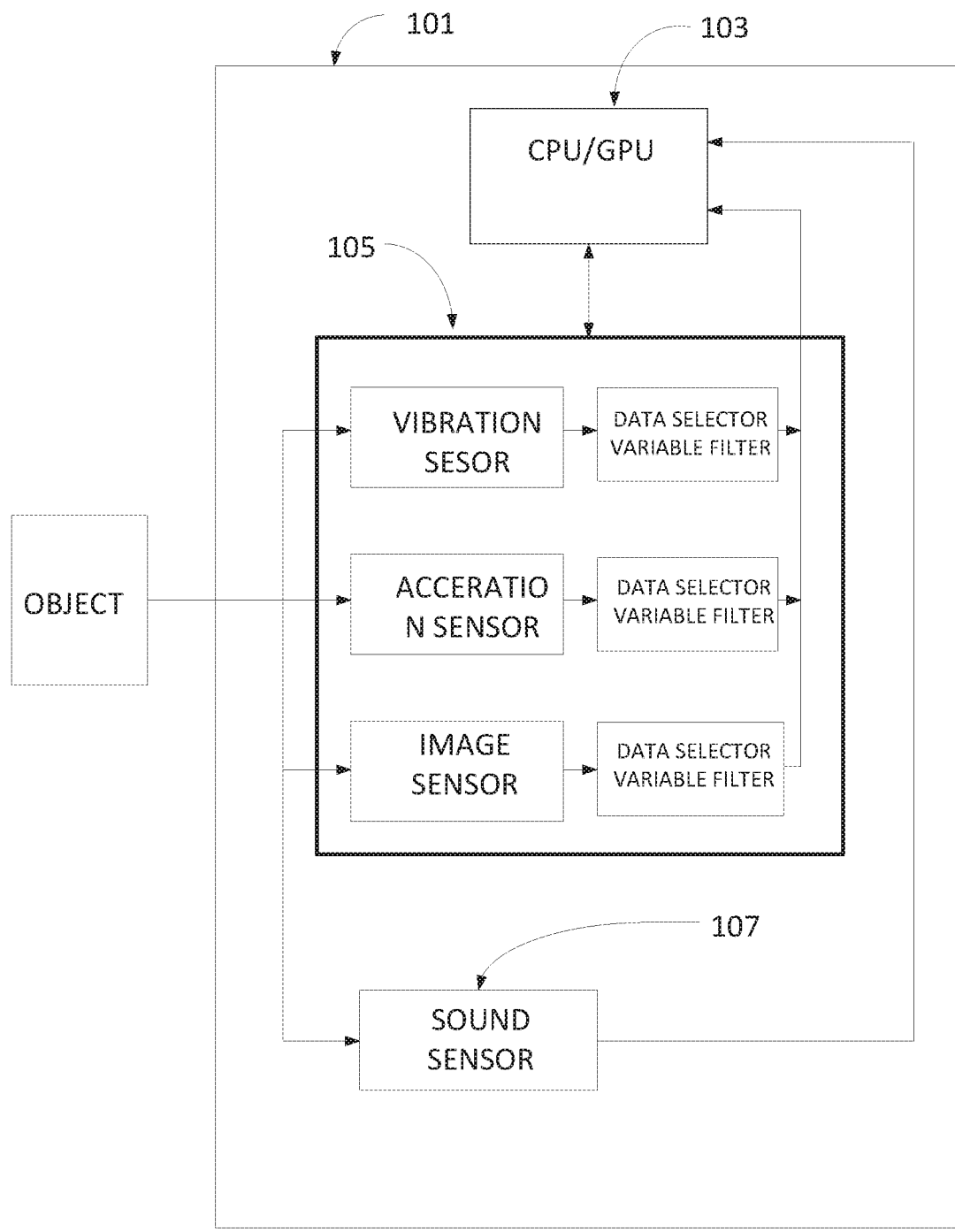
FIG. 1 illustrates a sensor platform including a processing unit having CPU/GPU, and multiple sensors for detecting environmental data, such as vibration, acceleration and video signal and sound (audio) sensor.

Use of Sound Sensor to Complement a Multi-Sensor Platform for Improved Prediction Analysis FIG. 1 illustrates an embodiment of the sensor platform 101 of the present invention. Sensor platform 101 includes a processing unit 103 having CPU (Central Processing Unit) or GPU (Graphic Processing Unit) or both of them, and sensor unit 105 including multiple sensors, such as a vibration sensor, an acceleration sensor and an image sensor, such as a video camera, for detecting environmental data, such as vibration, acceleration and image signals from the object to be surveyed, and sound sensor 107, such as a microphone, for capturing sound signals from the object to be surveyed. The output signals from each sensor in the sensor unit 105 are transmitted to the processing unit 103 through data selector/variable filter for limiting the data that is needed to be processed, which is controlled by the processing unit 103. The data selector/variable filter can be adjusted programmatically by reading all the sensor data to determine the threshold. Processing unit 103 is arranged to run inference algorithms to control and adjust data selector/variable filter as well as those sensors and process data from those sensors.

The sound sensor 107 is newly added sensor in this embodiment. The output of the sound sensor 107 is transmitted to and processed by the processing unit 103 and used to select, complement or filter out the data from each sensor of the multiple sensors, such as a vibration sensor, an acceleration sensor and an image sensor for improved prediction analysis by working with data selectors/variable filters.

An embodiment of the present invention provides a solution to the current problems with the current sensor platforms having difficulty detecting minute conditions or states associated with the object or environment to be examined by incorporating a sound sensor to adjust/cancel/filter and improve accuracy/quality for processing data from other sensors. For example, a conventional sensor platform including vibration sensors and acceleration sensors has difficulty to detect subtle changes of road surface condition, such as cracks. That is why a high-speed and high precision camera was required to detect those subtle changes of road surface. A sound sensor is incorporated into the sensor platform to adjust/cancel/filter and improve accuracy/quality of using other sensors. Further, the output signals from the sound sensor are used to identify cracks on the road surface or other road surface distress imperfections by comparing with refence sound pattern captured, analyzed and accumulated through the sound sensor 107, which cannot be possible with other sensors, such as vibration sensors or acceleration sensors.

By incorporating sound sensor 107 into current sensor platform 103, it becomes possible to not only improve detecting capabilities, but it also becomes possible for the processing unit 103 to efficiently process the output data from other sensors. Detail will be described later.

Threshold on Fusion Sensors

When processing raw data from each sensor by using inference algorithms running on processing unit 103 including CPU or GPU or both of them, since the raw data from object to be surveyed includes unwanted data which should be removed before processing by using data selector/variable filter controlled by the inference algorithm running on CPU 103. When processing raw data including desired data with unwanted (unnecessary) data, processing time becomes long.

When applying refence data obtained by an enforced learning mode which includes positive examples obtained beforehand, the more the number of positive examples, learning speed becomes short. Accordingly, it is important for the inference algorithms to learn specific patterns to improve the efficiency of the processing data from object to be surveyed.

In order to efficiently process data (big data), apply data selector/variable filters to output signals from each sensor as illustrated in FIG. 1 to limit unnecessary data to obtain desired data needed to be processed. This data selector/variable filter can be adjusted programmatically by reading all sensor data beforehand to determine to select necessary data. For example, the processing unit 103 for running the inference algorithms are arranged to process output data from the sensor unit 105 when the sound signal level is more than the threshold level to omit noisy data. By repeating this action under the same or relatively similar condition using the same sensor platform, relatively desired data can be identified. Further by comparing raw data pattern with the reference sample data obtained beforehand, the survey can be improved. In order to create sample data used for specific reference patterns, the inference algorithms include an enforced leaning mode for collecting specific signal patterns to be used when the algorithms analyze the output data from the sensor. The algorithms include functions to start an enforced learning mode for collecting the specific signal patterns while sensing road surface conditions. By repeating this action under different condition, for example, under different weather condition, even under the same object, different sample patterns can be obtained. Inventors call this pattern a "model" which is a processed combination of the same pattern obtained from the same object under different weather conditions.

EXAMPLE 2

Sports Training System

Figure 2:
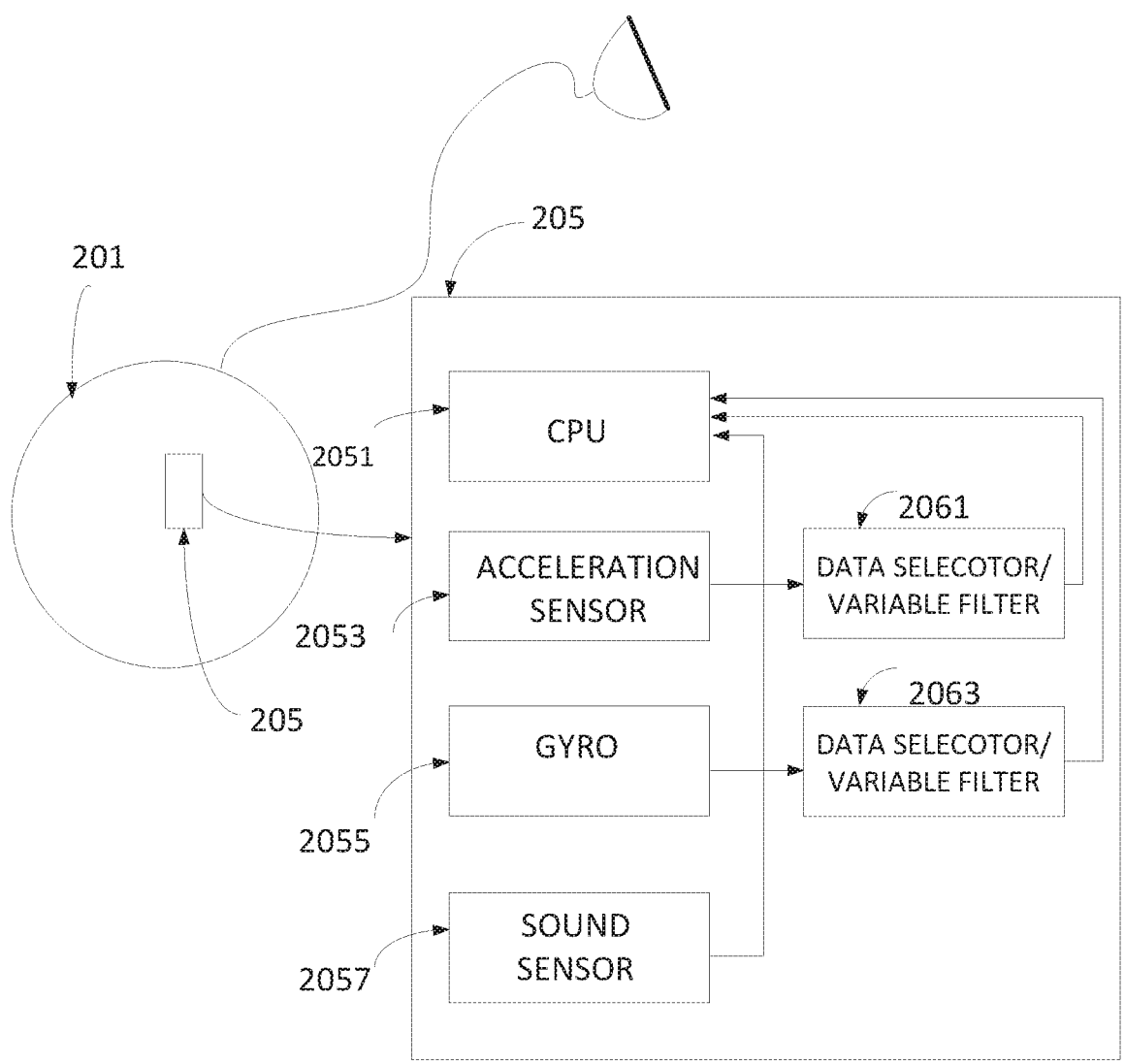
FIG. 2 illustrates a configuration of a sensor platform used in a sports training machine used for a hammer throw.

FIG. 2 illustrates a configuration of sensor platform used in a sports training system used for a hammer throw. Multiple-sensor platform 205 being controlled by CPU 2051 is attached onto the surface of hammer throw ball 201. Multi-sensor platform 205 includes CPU 2051, acceleration sensor (accelerometer) 2053, gyro 2055 and sound sensor (microphone) 2057.

In this embodiment, sound sensor 2057 is arranged to start capturing sound signals caused by the air flow passing over the surface on hammer throw ball 201 and to measure the rotation speed after the hammer throw ball 201 has reached a certain threshold level. This function will be discussed later.

When processing data in an inference algorithm in the computer programs running on CPU 2051, enormous time is necessary to process data when it includes unnecessary data that is often included when capturing raw data, because the inference algorithms would normally process every single piece of data including unnecessary data. In reinforcement learning, if there are many positive examples, learning speed becomes fast. Therefore, it is efficient to omit unnecessary data beforehand as much as possible to let the inference algorithm learns and accumulates positive patterns based on those positive examples.

In this embodiment, a fusion of sensors is utilized to reduce unnecessary data processing. To more efficiently handle data, the inference algorithm controls data selector/variable filter 2061 and 2063 connected to sensor output or groups or an entire set of sensors to limit the data that is needed to be processed. These filters can be adjusted programmatically using positive patterns created by analyzing all the sensor data and understanding data trends to determine a proper threshold level which determines stat timing for processing raw data by using output data from the sound sensor data beforehand.

A plurality of data selector/filters are used to control each sensor and data group to handle large-scale data (big data) efficiently by reducing the amount to only the data that is necessary for processing. Those data selector/filters can be adjusted by programmatically based on the observed trends in the big data analysis if needed.

In a hammer throw monitoring system, sensor platform 205 with sound sensor 2057, once the gyro 2055 (one of the input sensors) exceeds a certain threshold, then the CPU 2051 starts reading data from all sensors and feeding the data into the algorithm running on the CPU 2051. By doing this, the algorithm can focus on processing necessary data.

EXAMPLE 3

Characteristic Vibration

EXAMPLE 3 is used to explain a shock sensor for defining frequencies to be filtered out for audio measurements. By referencing constant/known frequencies, the data associated with constant/known frequencies can be removed from consideration as input into the algorithm, thereby focusing analysis only on data that is desired to be analyzed.

So called characteristic vibration (characteristic frequency) peculiar to the measurement system should be omitted as environmental noise signals. Because the characteristic vibration varies according to the apparatus to which the sensor platform is mounted, it is necessary to monitor and judge that these vibrations are not the behavior from the object under test.

In the case of sensor platforms used in sports category, for example, in a hammer throw training system, a sensor platform described above is mounted on the surface of the hammer throw ball. Vibration noise caused by the wire connected to the hammer throw ball while the ball flies in the air should be omitted because the vibration noise caused by the wire connected to the hammer ball is characteristic value that the hammer throw ball has.

EXAMPLE 4

Sensor Platforms for Sports Category

An example in a sports category will be described here. In the case of measurement of rotational speed of hammer throw ball, CPU 2051 mounted on the hammer throw ball is arranged to start measuring the speed of the ball by obtaining sound signals created by air flow on the surface of the throw ball from sound sensor 2057 when acceleration reaches to a certain level. In other words, the algorithm for controlling the sensor platform sets a certain threshold level to start recoding input signals from sensors for analysis so that the survey can concentrate only on the part of the environment survey deemed to be important, which results in reducing electrical energy consumption of the sensor platform.

Another Preferred Embodiment

Road Surface Conditions Survey

Figure 3:
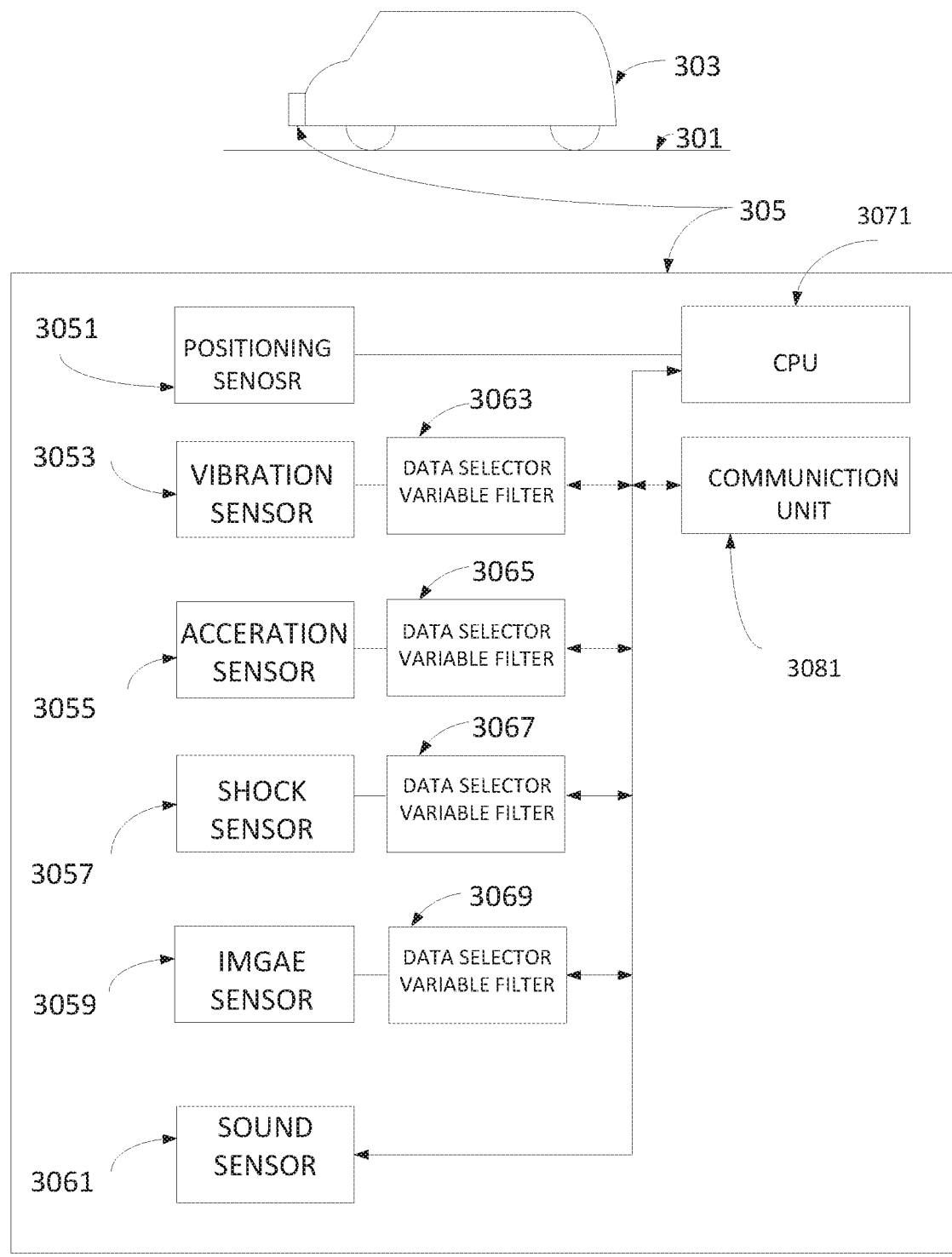
FIG. 3 illustrates a system configuration of a vehicle to which sensor platform is mounted which is used for road surface environmental survey.

FIG. 3 illustrates a system configuration of a vehicle 303 used for road surface condition survey which includes sensor platform 305 used for performing road surface environmental survey. Sensor platforms 305 is configured by a positioning sensor 3051, such as Satellite Technology devices including GPS (Global Positioning System) for outside of buildings, Terrestrial WiFi and Bluetooth for inside the buildings for obtaining the ground location, vibration sensor 3053, acceleration sensor 3055, shock sensor 3057, Image sensor 3059 such as Radar, Lidar and video camera for capturing road surface conditions and sound sensor 3061, such as a microphone for capturing sound signals from an object to be observed. The output signals from each sensor pass through data selectors/variable filters 3063, 3065, 3067 and 3069 for selecting data and limiting data frequency passing through each sensor respectively. Output signals from each sensor may include noise signals associated with the road surface environmental data passing through these sensors. It becomes possible to reduce the processing load on the computing capability of CPU 3071 in sensor platform 305 by selecting or limiting data from those sensors using data selectors/variable filter by setting a threshold value applied on each data selector/variable filter. For example, the algorithm running on the CPU 3071 used in the sensor platform 305 can lighten the processing load by limiting data from vibration sensor 3053, acceleration sensor 3055, shock sensor 3057, image sensor 3059 to the CPU 3071 using data selectors 3063, 3065, 3067 and 3069 to select or limit the data from each sensor.

Further, communication unit 3081 is used to transmit data between sensor platform 305 and a remote server (not shown) via communication network. The remote server may store a database associated with the environmental data and/or other programs which can be utilized by sensor platform 305.

One example: Assume that weather condition changes from cloudy to rain while collecting environmental data of the road surface, the output signals from each sensor changes due to the rain on the road surface. Accordingly, it is important to take account of these weather condition changes when processing environmental data. Because even on the same road surface, the signals picked up from the road surface becomes different due to the water of the rain. Accordingly, it is important to collect and analyze the same road condition in the different weather conditions. Inventors call these patterns under different weather conditions "different models" as references The algorithms used in the sensor platform 305 are arranged to change the model used when the weather changes while capturing road surface data. Weather changes may be detected by rain pick-up device installed in the vehicle or third-party websites providing weather condition. As described above, sensor plat form 305 is arranged to change a model as reference data pattern according to the weather change.

Algorithm used in the sensor platforms 305 does not start inference process even if there are some vibrations on a smoothly paved road. Or the algorithm used in the sensor platforms 305 sends the process to a manhole recognition processing routine (another program routine) and does not enter the complicated processing for ascertaining whether or not it is a naturally opened pothole on the road surface because it is more likely to be the vibration from man-made objects if the data is obtained when vehicle 301 traveling on the smooth road surface. The road conditions can be identified by monitoring the sound signals caused between the tires of the vehicle 303 and road surface 301.

Noise being caused by the stones spread over the road surface, man-made manhole on the road surface, bumps and potholes on the on the road surface can be identified by using comparison between the obtained data pattern and reference data obtained beforehand by analyzing sound data obtained beforehand through sound sensor 3061. This can reduce processing load of the CPU 3071.

When surveying road surface conditions using vehicle 303 illustrated in FIG. 3, sensor platform 305 includes sound sensor 3061 for obtaining sound signals when driving vehicle 303 on road surface 301 and shock sensor 3057 for detecting so called characteristic frequency which are generated by the vehicle itself to which the sensor platform 305 is mounted. In this embodiment of the present invention, sound sensor 3061, such as a microphone is placed inside the vehicle. In the case of current vehicles available in the market, the microphone is equipped as a part of audio systems used in the vehicle. In this embodiment, the microphone equipped inside the vehicle is used.

To that end, the characteristic frequency (or characteristic value) associated with the installation condition of the sensor platform 305 into the vehicle 303 to which the sensor platform 305 is mounted can be determined and factored out during analysis of sound data during analysis of a road.

One of the problems associated with the road surface environment survey is that the sensor platform 305 must continue to detect the environmental data while the test vehicle is driven on the road to be surveyed. This may interfere with certain prioritized processing. For example, when the road surface environment survey is performed on a smoothly paved road, there is little need to detect a big pothole or bump on the road. The sensor platform should concentrate processing on detecting the minute irregularities such as cracks. These problems can be solved by monitoring and analyzing the sound signals from the sound sensor as described above.

Next, calibration of sensor platform system using probe information will be described. There is provided probe information from sensor platform 305 mounted on a vehicle 303 used for road surface survey. The probe information may include following information, such as 1) road surface information, 2) location or position information where the sensor platform performing calibration of sensor platform and 3) time information when the sensor platform performs calibration of sensor, each information being associated with the survey conducted by the vehicle 303. 4) Vehicle ID that the calibration is carried out. 5) Weather information when the calibration is carried out may be included in the probe information. Further, the probe information is arranged to be stored in sensor platform 305 or a remote server (not shown) every time when the calibration is carried out.

Newly collected probe information is compared with previous probe data obtained by the same vehicle under the same or similar condition stored in the sensor platform or a remote server. When the data differences in the comparison is more that a predetermined range, the algorithms are arranged to turn on a flag bit meaning that the probe data differences obtained in the same or similar conditions by the same vehicle are more than a predetermined range. It becomes possible to survey the root cause why these differences occur when checking this flag bit. A countermeasure can be taken for this vehicle.

The probe information described above is arranged to be transmitted from sensor platform 303 to a server through communication unit 3081 via network. The probe information is stored in database in the server. The probe information is used as reference data for the places and/or points from which the probe information is obtained.

After that, if another vehicle "X" to which the same survey platform 305 is mounted passes through the same place or point and catches the road surface environmental data associated with the same place or point. Then if there are differences between the stored data in the sever and the road survey environmental data obtained by the vehicle 'X". In this case, the causes of the differences are estimated as follows.

a) The differences of tire air pressure, suspension differences and body weights being characteristic values of each associated vehicle.

b) Strength differences for mounting the sensor platform to the vehicles.

c) Vehicle travel path (the position on which a tire of the vehicles runs is different)

d) Environmental differences other than the sensor platform.

These errors become the specific data in collecting road surface detection data. According to an embodiment of the present invention, the algorithm used for the road surface environmental survey automatically identifies the calibration place or point, which will be described later. An embodiment of the present invention is characterized by carrying out calibration by applying filter function as described above, such as raising the lower threshold for each error to omit unnecessary data inputs.

Followings are examples of calibration points:

a) Clean (well paved) flat road, in other words, the output level of the sound sensor is less than a predetermined level while traveling on the clean (well paved) flat road.

b) Bump and Dip existing independently. (The reason for "existing independently" is that since the sensor platform can possibly incorporate GPS errors due to the fact that the bump and dip exist independently not continuously.)

c) Specific marks for notifying a calibration point is provided on the surface of the road:

Sensor platform is arranged to automatically change processing mode of the algorithms into a calibration mode when identifying a bump patterns (for example, Morse Code) for showing calibration area provided at the beginning and stopping the calibration mode when identifying a bump pattern for showing an ending pattern at the ending of the calibration area on the road. This special bump pattern may create sound signals falling within audible or outside the audible frequency range when driving the vehicle at a speed between 5 miles/hour and 65 miles/hour. Then the driver of the vehicle can hear the sound signals of the pattern when passing through the patter. In another example, this special bump pattern may create sound signals falling outside the audible frequency range when driving the vehicle at a speed between 5 miles/hour and 65 miles/hour. In this case, the sound signals can be captured by a receiver, which can detect the sound signals falling outside the audible frequency range. By using these bump patterns, general vehicles equipped with this sensor platform can collect the road surface data by performing automatic calibration while performing normal business such as delivery of the goods. A wireless unit for oscillating radio signals can be used instead of the special bump pattern structured on the road surface.

Other Embodiments

Following are applications to which an embodiment of the present invention may be applied.

a) Detecting conditions in a mine.

b) Detecting conditions in a warehouse.

c) Detecting conditions of iced bobsled tracks.

d) Analyzing factory line conditions.

e) Analysis of sports training, such as golf club swing, ice hockey stick swing and tennis racket swing.

What is claimed is:

1. A sensor platform being installed on a vehicle traveling on a road or a sports training device, the sensor platform comprising:
   a sensor unit configured by any one or any combination of an acceleration sensor, a shock sensor, an image sensor and a vibration sensor for capturing environmental data transmitted from an object to be surveyed;
   a data selector/variable filter for selecting necessary data or limiting data frequency of the environmental data transmitted from the sensor unit;
   a sound sensor for capturing sound signals from the object to be surveyed; and
   a processing unit for running computer programs including algorithms for controlling the sensor unit and the data selector/variable filter, analyzing the environmental data from the data selector/variable filter and the captured sound signals, and setting a threshold level by checking analysis results of the captured sound signals so as to limit unnecessary environmental data to be processed by the processing unit,
   wherein the processing unit is arranged to run inference algorithms for learning specific signals patterns contained in the captured environmental data by referring to the captured sound signals to limit unnecessary environmental data to be processed by the processing unit.

2. The sensor platform of claim 1, wherein the algorithms further include functions for starting the inference algorithms for collecting the specific signal patterns found in the environmental data from the data selector/variable filter and the captured sound signals when the algorithms analyze the environmental data from the data selector/variable filter and the captured sound signals to form the specific signal patterns as reference patterns.

3. The sensor platform of claim 2, wherein the inference algorithms starts when a signal level of the environmental data from the sensor unit is more than a predetermined threshold level.

4. The sensor platform of claim 3, wherein the algorithms are arranged to automatically stop processing the environmental data from the data selector/variable filter and enter a calibration mode when identifying a first predetermined pattern found on a surface of the road for showing a beginning of a calibration area.

5. The sensor platform of claim 4, wherein structure of the first predetermined pattern formed on the surface of the road is shaped so that frequencies of sound signals generated by the first predetermined pattern obtained from the captured sound signals falls in an audible frequency band when driving the vehicle at a speed between 5 miles/hour and 65 miles/hour.

6. The sensor platform of claim 4, wherein structure of the first predetermined pattern formed on the surface of the road is shaped so that frequencies of sound signals generated by the first predetermined pattern obtained from the captured sound signals falls out of an audible frequency band when driving the vehicle at a speed between 5 miles/hour and 65 miles/hour.

7. The sensor platform of claim 4, further comprising:
   a positioning sensor for detecting a ground location where the sensor platform is located; and
   a communication unit for transmitting the environmental data from the data selector/variable filter between the sensor platform and a remote server via communication network.

8. The sensor platform of claim 7, wherein the positioning sensor comprises one or more auxiliary sensors selected from the group consisting of a GPS (Global Positioning System) for outside of buildings, Terrestrial WiFi and Bluetooth for inside the buildings for obtaining the ground location.

9. The sensor platform of claim 7 wherein the remote server is arranged to store a database associated with the environmental data from the data selector/variable filter or other programs which can be utilized in the algorithms.

10. The sensor platform of claim 2 wherein the algorithms include a function for changing reference models to be used when comparing the environmental data from the senor unit or the captured sound signals according to weather conditions.

11. The sensor platform of claim 4 wherein the algorithms include a function for setting a flag bit when differences between environment data obtained in a first calibration mode and a second calibration mode carried out by the same vehicle on the same calibration area are more than a predetermined range.

\* \* \* \* \*